April 27, 1954  E. J. REICHELDERFER  2,676,821
JOINT FOR WINDSHIELD WIPER ARMS
Filed Feb. 28, 1950
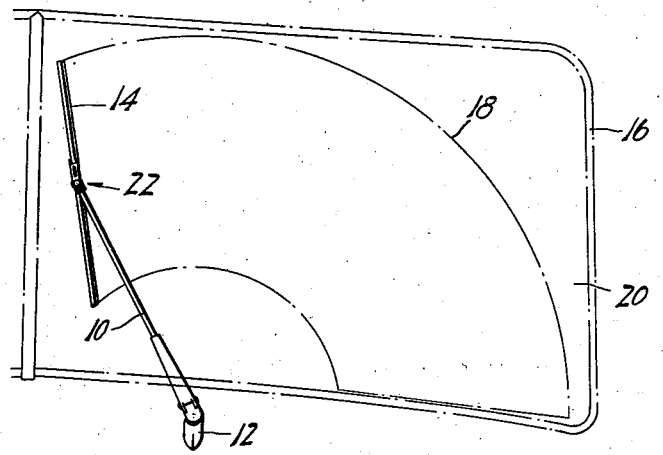
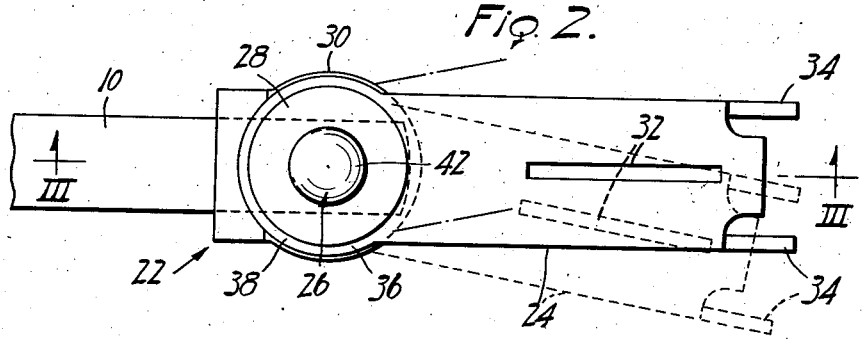
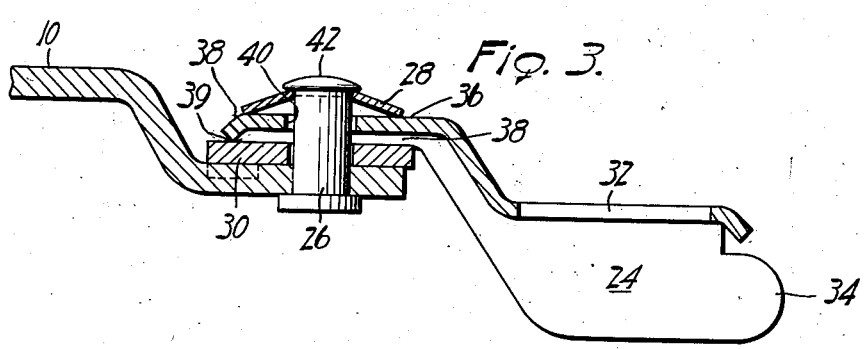
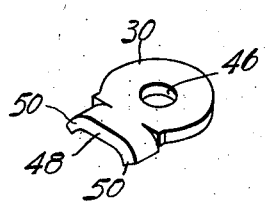
INVENTOR
Edgar J. Reichelderfer
BY
Bean, Brooks, Buckley & Bean
ATTORNEYS Patented Apr. 27, 1954

2,676,821

UNITED STATES PATENT OFFICE 2,676,821

JOINT FOR WINDSHIELD WIPER ARMS

Edgar J. Reichelderfer, Hamburg, N. Y., assignor to Trico Products Corporation, Buffalo, N. Y.

Application February 28, 1950, Serial No. 146,681

5 Claims. (Cl. 287—14)

This invention relates to the art of windshield cleaning and has particular reference to the arm which carries the wiper blade back and forth across the windshield surface. The wiper arm has heretofore been designed with an adjustable blade carrying tip, so as to be adaptable to windshields of various motor vehicles.

The object of the present invention is to provide an improved construction for tips of the foregoing type.

More particularly the invention has for its object to provide a wiper arm tip which will be readily adjustable without the use of tools, and yet will retain its adjusted position without loosening. Additionally, it is an object of the invention to provide an adjustable tip for a wiper arm which will have nearly uniform characteristics of adjustment retentivity throughout its entire range of adjustment. It is also an object of the invention to provide a wiper arm tip which will have the foregoing qualities and yet will be simple and inexpensive to manufacture.

Fig. 1 is a general view showing a wiper assembly embodying the present invention in operating position in relation to a motor vehicle windshield;

Fig. 2 is a plan view of a wiper arm tip of the present invention;

Fig. 3 is a sectional view taken along line III—III of Fig. 2;

Fig. 4 is a detail perspective view of the arm friction plate of the present invention.

Referring more particularly to the drawing, the numeral 10 designates the usual wiper arm, rotatably mounted by means of fitting 12 so as to press the usual wiper blade 14 against the motor vehicle windshield 16 and cause the said wiper blade to traverse a path 18 across the glass 20 when the motor connected to the arm is operating, as is well known in the art.

The wiper arm 10 is fitted with a tip 22 of the present invention, for adjustable attachment of the blade 14 to the arm. The tip 22 comprises a clip member 24 which is adjustably attached to the arm 10 by means of a rivet 26 and a cup washer 28. An arm friction plate 30 may be interposed to provide a broad bearing surface on the outer end of the arm body. The clip member 24 is formed at one end with the usual slot 32 and ears 34 for receiving and embracing the wiper blade so as to support and guide the same for glass wiping purposes. The other end of clip 24 is formed with a mounting base or disk 36 having a marginal depending flange 38 thereabout. Flange 38 is formed at an angle to provide a sharp edge 39 at the underside of the base 36. A hole 40 is located centrally of the base for free passage of rivet 26 therethrough.

The cup washer 28 is formed as a frustum of a hollow right circular cone, so as to provide a resilient means for the transmission of pressure from the head 42 of the fastener or rivet 26 to the periphery of the base 36 of the clip 24. The flange 38 of the base is adapted to press with its sharp edge 39 against the arm friction plate 30 in the peripheral region thereof. Consequently, the fastener-imposed clamping pressure is distributed by the flaring washer 28 directly to the downturned marginal flange 38 to confine the binding friction primarily to the marginal edge 39 where it bears upon the arm body 10, or the interposed arm carried plate 30. The central portion of the mounting base 36 will be supported spaced from the plate 30 to definitely locate the applied clamping pressure to the marginal area. This affords a lever advantage in the friction hold of the fastener 26 so that the latter does not have to be subjected to an extreme upsetting pressure. The plate 30, of generally circular shape, is formed with a hole 46 located centrally thereof for free admission of the rivet 26. A locking lug 48 with ears 50 extends at one side of the plate 30, for embracing engagement with the wiper arm 10.

In assembled condition, the rivet 26 clamps the base 36 of the clip 24 firmly but adjustably between the cup washer 28 and the friction plate 30. The cup washer 28 is slightly resilient, so as to keep the connection permanently tight. Since the friction plate 30 is locked in registry with the arm 10 by the ears 50, relative movement between the clip 24 and the arm is resisted by friction between the edge 39 of the flange 38 and the friction plate. It should be noted that the use of a conical washer and a mounting base with a depending flange concentrates the frictional pressure at the periphery of the parts, for the most effective resistance to movement. Additional friction to resist relative movement between clip and arm may be provided by so dimensioning rivet 26 as to provide tight fits between the said rivet and wiper arm, and between said rivet and the cup washer 28. Then the cup washer will be held in fixed relation to the wiper arm as it presses against the base 36 of the clip.

Thus a simple construction is provided whereby the clip 24 and the wiper 14 may be adjusted to form a desired angle with arm 10, by manual manipulation without the use of tools. The use of the cup washer 28 makes it possible to use a permanent rivet to hold the parts together. The circularly symmetrical shape of the washer of the present invention is such that the friction surface and the pressure between the said washer and the base of the clip is the same through the entire range of adjustment of the clip relative to the wiper arm. The same is true of the circular friction plate. Therefore, the construction possesses substantially the same amount of friction in all positions through which it is adjustable, and does not tend to loosen as the result of repeated adjustments or the passing of time.

Although only a preferred embodiment of the invention has been shown and described, it will be apparent to those skilled in the art that the invention is not necessarily so limited but that various changes may be made therein without departing from the spirit and scope of the appended claims.

What is claimed is:

1. A wiper arm having an elongate body with its outer end provided with a substantially flat surface, a wiper attaching clip having a mounting base superimposed upon said surface of the end, a pressure distributing washer on the mounting base, and rivet means piercing the three superimposed parts aforesaid and exerting clamping pressure axially, the margin of the mounting base being downturned about the rivet means to support the central portion of the mounting base spaced from said surface and to locate the binding pressure between said base and said surface marginally, and said washer being acted upon centrally by the rivet means and being shaped relative to said mounting base for contact therewith restricted to the periphery thereof adjacent its downturned margin for distributing the clamping pressure to such marginal area in substantial peripheral alignment with said downturned margin.

2. A wiper arm having an elongate body with its outer end provided with a substantially flat surface, a wiper attaching clip having a mounting base superimposed upon said surface of the end, a pressure distributing washer on the mounting base, and rivet means piercing the three superimposed parts aforesaid and exerting clamping pressure axially, the margin of the mounting base supporting the central portion of the mounting base spaced from said surface and locating the binding pressure between said base and said surface marginally, and said washer being acted upon centrally by the fastener and being shaped relative to said mounting base for marginal contact therewith restricted to the periphery thereof adjacent its margin for distributing the clamping pressure to such marginal area outwardly beyond the centrally applied clamping pressure and in substantial peripheral alignment with said margin.

3. A wiper arm for windshield cleaners, a friction plate superimposed upon said arm at the outer end thereof, a wiper attaching clip having a mounting base superimposed upon said friction plate, a frustro-conical washer on the mounting base, and rivet means piercing the four superimposed parts aforesaid and exerting clamping pressure axially, friction means supporting the central portion of the mounting base spaced from said plate and locating the binding pressure between said base and said plate marginally, and said washer being acted upon centrally by the rivet means and having marginal contact with the mounting base adjacent its margin for distributing and limiting the clamping pressure to such marginal area in substantial peripheral alignment with said friction means, and means for fixing the position of said friction plate relative to said arm.

4. A wiper arm for windshield cleaners, a generally circular friction plate on said arm at the outer end thereof, said plate having depending locking ears embracing said arm, a wiper attaching clip having a generally circular mounting base with a peripheral depending flange superimposed upon said friction plate, a frustro-conical washer on the mounting base, and a rivet piercing the four superimposed parts aforesaid and exerting clamping pressure axially, said flange supporting the central portion of the mounting base spaced from said friction plate and locating the binding pressure between said base and said plate marginally, and said washer being acted upon centrally by the rivet and having an outwardly spaced marginal contact with the mounting base adjacent its margin in substantial alignment with said flange for distributing and limiting the clamping pressure to such marginal area outwardly beyond the centrally applied clamping pressure.

5. A wiper arm for windshield cleaners, a generally circular friction plate on said arm at the outer end thereof, said plate having depending locking ears embracing said arm, a wiper attaching clip having a generally circular mounting base with a peripheral depending flange having a sharp edge superimposed upon said friction plate, a frustro-conical washer on the mounting base, and a rivet piercing the four superimposed parts aforesaid and exerting clamping pressure axially, said sharp edge of said flange supporting the central portion of the mounting base spaced from said friction plate and locating the binding pressure between said base and said plate marginally, and said washer being acted upon centrally by the rivet and having an outwardly spaced marginal contact with the mounting base adjacent its margin in substantial alignment with said flange for distributing and limiting the clamping pressure to such marginal area outwardly beyond the centrally applied clamping pressure, said rivet having a tight fit with said washer and said arm.

References Cited in the file of this patent

UNITED STATES PATENTS

| Number | Name | Date |
| --- | --- | --- |
| 765,598 | Schlag | July 9, 1904 |
| 785,481 | D'Olier | Mar. 21, 1905 |
| 1,108,663 | Ashman | Aug. 25, 1914 |
| 1,519,022 | Deisher | Dec. 9, 1924 |
| 1,649,951 | English | Nov. 22, 1927 |
| 1,787,270 | Hayden | Dec. 30, 1930 |
| 1,940,054 | Herrold | Dec. 19, 1933 |
| 2,290,140 | Anderson | July 14, 1942 |
| 2,392,670 | Horton | Jan. 8, 1946 |
| 2,449,357 | Zaiger | Sept. 14, 1948 |
| 2,528,979 | Smulski | Nov. 7, 1950 |